United States Patent
Hanten

(10) Patent No.: US 9,598,193 B2
(45) Date of Patent: Mar. 21, 2017

(54) CLIPPING DEVICE AND METHOD CONTROLLING SAID CLIPPING DEVICE

(71) Applicant: Poly-clip System GmbH & Co. KG, Hattersheim (DE)

(72) Inventor: Jürgen Hanten, Bad Nauheim (DE)

(73) Assignee: Poly-clip System GmbH & Co. KG, Hattersheim (DE)

( * ) Notice: Subject to any disclaimer, the term of this patent is extended or adjusted under 35 U.S.C. 154(b) by 821 days.

(21) Appl. No.: 13/940,998

(22) Filed: Jul. 12, 2013

(65) Prior Publication Data
US 2014/0013706 A1    Jan. 16, 2014

(30) Foreign Application Priority Data

Jul. 13, 2012 (EP) .................................. 12176315

(51) Int. Cl.
*B65B 51/04* (2006.01)
*B65B 57/08* (2006.01)
*A22C 11/12* (2006.01)

(52) U.S. Cl.
CPC ............ *B65B 51/04* (2013.01); *A22C 11/125* (2013.01); *B65B 57/08* (2013.01)

(58) Field of Classification Search
CPC ......... B65B 9/12; B65B 51/04; B65B 51/043; B65B 51/046; B65B 51/05; B65B 51/08; B65B 57/02; B65B 57/08; A22C 11/125
USPC ................ 53/53, 505, 506, 72, 138.1–138.4; 29/243.56
See application file for complete search history.

(56) References Cited

U.S. PATENT DOCUMENTS

| | | | | |
|---|---|---|---|---|
| 4,083,164 A | * | 4/1978 | Hagedorn | ............... B65B 51/05 29/243.56 |
| 4,100,716 A | * | 7/1978 | Barroso | .................. B65B 51/04 29/243.56 |
| 4,559,754 A | * | 12/1985 | Bacon | ................... B07C 5/3404 53/138.7 |

(Continued)

FOREIGN PATENT DOCUMENTS

| | | |
|---|---|---|
| CN | 101130392 A | 2/2008 |
| EP | 0900733 A1 | 3/1999 |

(Continued)

OTHER PUBLICATIONS

JPO machine translation of JP 6-99953, retrieved Apr. 28, 2016, 6 pages.*

*Primary Examiner* — Stephen F Gerrity

(74) *Attorney, Agent, or Firm* — Fitch, Even, Tabin & Flannery LLP

(57) ABSTRACT

A clipping device is provided for closing at least one closure, like a closure clip, in a packaging machine, for closing tubular or bag-shaped packaging casings as well as a method for controlling a clipping device. The clipping device includes a first closing tool and a second closing tool, wherein at least the first closing tool is reversibly movable towards the second closing tool, between an opened position and a closed position, for closing the at least one closure means and a drive for reversibly moving at least the first closing tool towards the second closing tool in a closing direction. In the clipping device, a monitoring device is provided in the region of the second closing tool for monitoring the second closing tool being prepared for the next clipping cycle.

20 Claims, 1 Drawing Sheet

(56) References Cited

U.S. PATENT DOCUMENTS

| | | | | |
|---|---|---|---|---|
| 5,048,259 A | * | 9/1991 | Cox et al. | B65B 7/2842 53/132.1 |
| 5,465,549 A | * | 11/1995 | Lummus | B65B 57/08 53/138.7 |
| 5,771,664 A | * | 6/1998 | Recchia, Jr. | B65B 51/08 53/136.5 |
| 6,112,499 A | | 9/2000 | Lyskawa et al. | |
| 2004/0072523 A1 | * | 4/2004 | Stimpfl | A22C 11/125 452/49 |
| 2006/0266230 A1 | * | 11/2006 | Vereschagin | B65B 13/16 100/8 |
| 2006/0272374 A1 | | 12/2006 | Meyrahn et al. | |
| 2007/0011990 A1 | * | 1/2007 | Ebert | B65B 57/04 53/417 |
| 2007/0012813 A1 | | 1/2007 | Topfer | |
| 2007/0044434 A1 | * | 3/2007 | Pargatzi | B65B 51/043 53/417 |
| 2008/0014847 A1 | * | 1/2008 | Waldstaedt | A22C 11/105 452/32 |
| 2010/0107565 A1 | * | 5/2010 | Meyrahn | B65B 51/04 53/417 |

FOREIGN PATENT DOCUMENTS

| | | | |
|---|---|---|---|
| JP | 06099953 A | * | 4/1994 |
| WO | 2007000301 A1 | | 1/2007 |

* cited by examiner

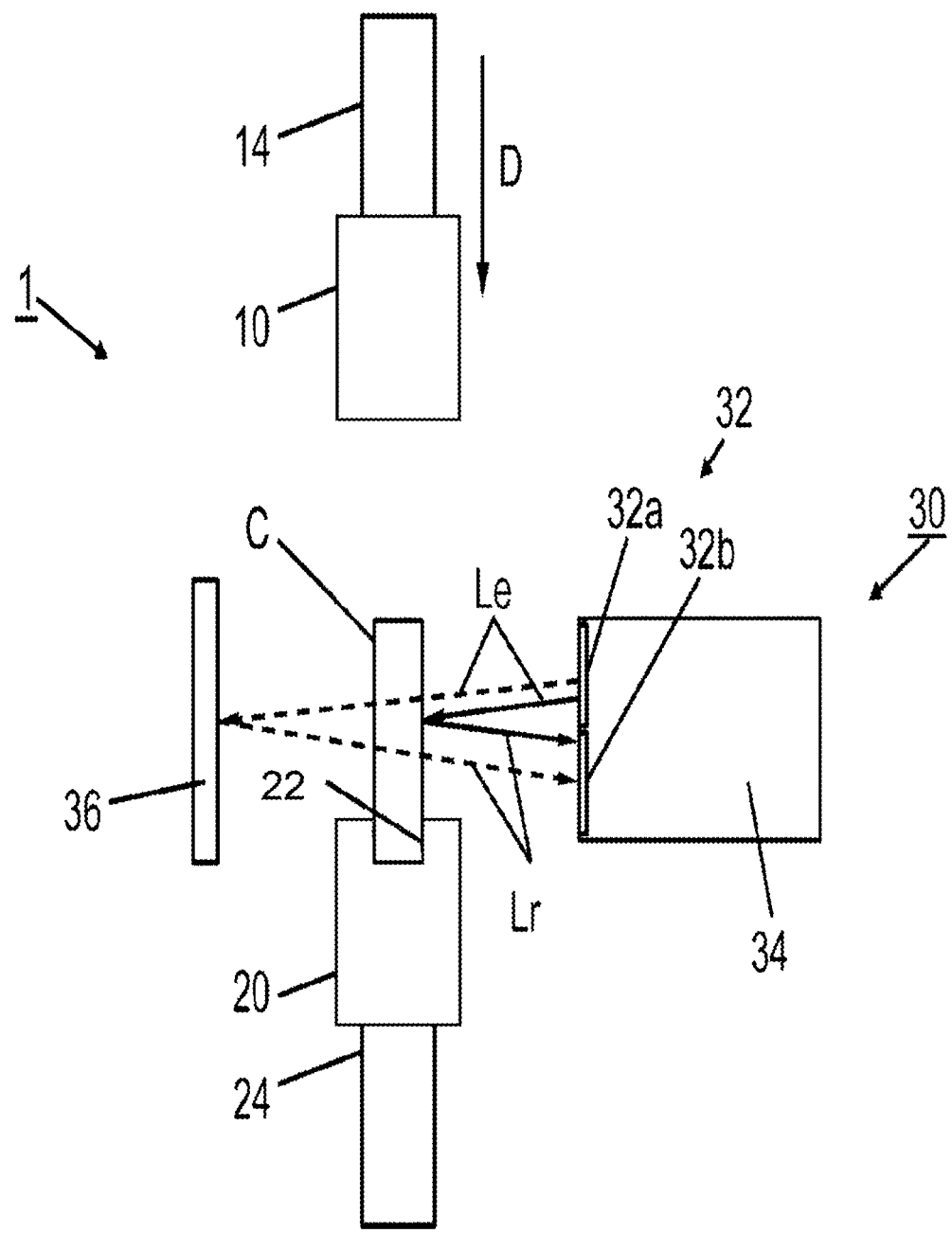

CLIPPING DEVICE AND METHOD CONTROLLING SAID CLIPPING DEVICE

This application claims priority to, and the benefit of, European Patent Application No. 12 176 315.5 filed 13 Jul. 2012 with the European Patent Office, which is hereby incorporated by reference.

BACKGROUND OF THE INVENTION

The present invention relates to a clipping tool assembly for closing at least one closure means, like a closure clip, in a packaging machine, for closing tubular or bag-shaped packaging casings, a method for controlling a clipping device, a clipping machine for producing sausage-shaped products as well as the use of the clipping device in a packaging machine for closing tubular or bag-shaped packaging casings.

In particular, the present invention relates to a clipping device for closing at least one closure means, like a closure clip, in a packaging machine, for closing tubular or bag-shaped packaging casings. The clipping device comprises a first closing tool and a second closing tool, wherein at least the first closing tool is reversibly movable towards the second closing tool, between an opened position and a closed position, for closing the at least one closure means, and a drive means for reversibly moving at least the first closing tool towards the second closing tool in a closing direction.

The present invention further relates to a method for controlling a clipping device in a packaging machine, like a clipping machine, for closing tubular or bag-shaped packaging casings, a clipping machine for producing sausage-shaped products, like sausages, by filing a filling material into a tubular or bag-shaped packaging casing and closing said packaging casing by a closure means, like a closure clip and, the present invention relates to a clipping tool assembly for use in a packaging machine for closing tubular or bag-shaped packaging casings by at least one closure means, like a closure clip.

In the practice, it is known that, for example in the production of sausage-shaped products, filling material is fed by a filling machine through a filling tube of a clipping machine into a tubular casing material, which is stored on the filling tube and which is closed at its front end by a closure clip. The tubular casing material is pulled off from the filling tube while being filled. After a predetermined volume of filling material is filled into said tubular casing material, a displacement device with a first and a second pair of displacement elements forms a plait-like portion of the tubular casing material and the clipping machine places and closes at least one closing clip at the plait-like portion forming the back end of the sausage shaped product by respective closing tools which are reversibly movable towards the plait-like portion. After that, the sausage-shaped product just produced, is separated from the remaining casing material by a knife or the like of a cutting device of the clipping machine. The produced sausage-shaped products may contain various flowable filling materials, e.g. sausage meat, grease, adhesives, sealing compounds or the like.

From EP patent 0 900 733, a clipping machine for producing sausages is known, including first and second closing tool, a punch and a die, which are mounted to first ends of respective closing levers coupled by their second ends to a common pivot axis. For reversibly moving the closing tools between their opened and closed position, in order to place and close a closure clip on the filled and gathered tubular packaging casing, the closing levers are driven by a cam plate.

According to the kind of products, chubby filled sausages or loosely filled nets, and the material of which the closure clips are made, like metal or plastic, said closure clips have to be closed with a respective closing force for securely closing the packaging casing.

In particular, in the case that a high pressure is necessary for closing the closure clip between the first and second closing tools, the clip material may adhere to one or both of the closing tools. Accordingly, when discharging the just closed packaging casing from the clipping machine, and the closure clip is adhered to one of the closing tools, the casing material of said packaging casing may be damaged or the closure clip retained in the closing tool may break off from said packaging casing. In both cases, the production process has to be stopped for removing the closure clip sticking in the closure tool and the filling material dropped off from the damaged packaging casing, causing a higher amount of waste and maintenance costs. Additionally, depending on the kind of filling material, in particular, in the case that an explosive has to be packaged in a clipping machine, a metallic closure clip or parts thereof, remaining in one of the clipping tool after a clipping cycle has been finished, may cause an extreme accident.

Thus, it is an object of the present invention to provide a clipping tool assembly with which the above mentioned drawbacks can be overcome and with which the closing process of sausage- or bag-shaped products is enhanced.

BRIEF SUMMARY OF THE INVENTION

According to the present invention, there is provided a clipping device for closing at least one closure means, like a closure clip, in a packaging machine, for closing tubular or bag-shaped packaging casings. The clipping device comprises a first closing tool and a second closing tool, wherein at least the first closing tool is reversibly movable towards the second closing tool, between an opened position and a closed position, for closing the at least one closure means, and a drive means for reversibly moving at least the first closing tool towards the second closing tool in a closing direction.

In the inventive clipping device, a monitoring device is provided in the region of the second closing tool for monitoring the second closing tool being prepared for the next clipping cycle. The monitoring of the second closing tool securely prevents starting a subsequent closing cycle in the case that a closure clip or parts thereof, or any other debris, remains in the respective closing tool before the next clipping cycle starts. Naturally also the first closing tool may be monitored or both, the first and second closing tool.

For monitoring the second closing tool, the monitoring means comprises at least a sensor element. Said sensor element may securely detect whether any remains have been left in the second closing tool.

In an advantageous embodiment of the clipping device, the sensor element is a laser sensor or a photo-sensor. These sensors may easily be integrated into a control process of clipping device and the respective packaging machine, accordingly.

Depending on the kind of the sensor element, e.g. when using a light barrier sensor or photo-sensor, the monitoring device further comprises a reflector element. Said reflector element securely reflects the light beam sent from the sensor, back to a receiving portion of said sensor. Incorrect signals, caused by reflections, may be omitted.

In a further advantageous embodiment of the clipping device according to the present invention, the monitoring device comprises an emitter element, like a light source, and a receiver, like a sensor element, which are accommodated in a common housing. This enables a compact construction of the monitoring device, and prevents emitter and receiver from being damaged or contaminated.

In order to prevent a clipping cycle to be started although a closure clip or parts thereof are detected in the clipping tool, the inventive monitoring device is adapted to output a signal identifying the presence or absence of a closure means in the second closing tool. Said signal may be sent to a control unit for controlling the clipping process, like continuing or stopping the clipping process.

The method for controlling a clipping device in a packaging machine, like a clipping machine, for closing tubular or bag-shaped packaging casings, the method comprises the step of controlling the clipping device on the basis of a signal received from a monitoring device and stopping the clipping device in case of the presence of a closure means in the second closing tool. The method enables a secure operation of the clipping device and the packaging machine, accordingly.

A clipping machine for producing sausage-shaped products, like sausages, by filing a filling material into a tubular or bag-shaped packaging casing and closing said packaging casing by a closure means, like a closure clip, the clipping machine, which comprises a clipping device according to the present invention provides the same advantages as described in conjunction with the inventive clipping device itself.

Furthermore, the clipping device according to the present invention may be used in a packaging machine for closing tubular or bag-shaped packaging casings by at least one closure means, like a closure clip. That means, the use of the inventive clipping tool assembly is not limited to the production of sausage-shaped products. The inventive clipping tool assembly may be used in each packaging machine in which a packaging material is closed by a closure means, like a closure clip.

Further advantages and preferred embodiments will be described in the following together with the drawing described below. The expressions "left", "right", "below" and "above" used in the following description, are referred to the drawing in an alignment such that the reference numbers and the notation of the FIGURE used can be read in normal.

BRIEF DESCRIPTION OF THE DRAWINGS

The sole FIG. 1 shows a schematic view to an embodiment of a clipping tool assembly according to the present invention.

DETAILED DESCRIPTION OF THE INVENTION

As it can be seen in FIG. 1, clipping device 1 comprises a first closing tool, namely a punch 10, and a second closing tool in the form of a die 20, in their opened position, in which punch 10 and die 20 are spaced from each other. Punch 10 is positioned vertically above die 20 and is reversibly movable towards die 20 in closing direction D for closing a closure clip C, which is, according to the embodiment of FIG. 1, positioned in die 20. For securely holding closure clip C in position, die 20 comprises a groove 22.

Clipping device 1 further comprises first and second drive means 14, 24 for moving punch 10 and die 20 towards each other for closing closure clip C there between.

First and second drive means 14, 24, which are only schematically depicted in FIG. 1, may be include piston/cylinder arrangements for linearly moving first and second closing tools 10, 20 in closing direction D. Alternatively, first and second closing tools 10, 20 may be supported on pivot levers for pivoting first and second closing tools 10, 20 towards each other.

As it further may be seen in FIG. 1, a monitoring device 30 is provided in the region of die 20. Monitoring device 30 comprises an emitter in the form of a light source 32a and a receiver 32b, which together form a sensor element 32. Sensor element 32 is accommodated in a housing 34 and arranged laterally to die 20 in a manner that the light beam Le emitted by light source 32a is directed towards die 20. A reflector element in the form of a mirror 36 is positioned on the opposite side of die 20 and aligned to sensor element 34 to reflect light beam Le emitted by light source 32a back to receiver 32b to be received as light beam Lr.

In a clipping machine for closing tubular or bag-shaped packaging casings by means of a substantially U-shaped closure clip C, the packaging casing material is gathered by respective gathering means, whereby a plait-like portion is formed on which a closure clip C has to be placed and closed. In the embodiment of clipping device 1 according to FIG. 1, closure clip C is provided in second closing tool 10. The plait-like portion is positioned between first and second closing tools 10, 20. When first and second closing tools 10, 20 are moved towards each other, closure clip C is applied to said plait-like portion and the legs of closure clip C are bent around the plait-like portion due to the pressure applied thereto by first and second closing tools 10, 20, which are then in their closed position. After the packaging casing has been closed by closure clip C, first and second closing tools 10, 20 are mowed away from each other into their opened position (as shown in FIG. 1), and the closed packaging casing is removed from the packaging machine.

In this situation, after the just closed packaging casing has been removed from the packaging machine, first and second closing tools 10, 20 should be free from any remains before the next clipping cycle may be started.

Monitoring device 30 monitors die 20 for detecting any remains in die 20. In some cases it may occur that in the previous clipping cycle two closure clips where placed in die 20, but only one closure clip C has been applied to the plait-like portion of the previously closed packaging casing, whereas said second closure clip C remains in die 20. Thus, when starting the next clipping cycle a further closure clip is fed to die 20, and when continuing this closure cycle, the quality of the subsequently closed product is affected. It is also possible that a part of the just closed closure clip may break off from said clip and remain in die 20, with the same result to the quality of the subsequently closed product.

In case that monitoring device 30 detects a closure clip C or parts thereof in die 20 after the just closed product has been removed from the packaging machine, a signal will be sent to a control unit (not shown in FIG. 1) for stopping the actual closing cycle. Additionally, a signal may be sent to an operator to eliminate the present malfunction.

Monitoring device 30 may permanently monitor die 20 in order to detect remains therein. It is also possible that monitoring device 30, controlled by a control unit, is activated intermittently, to monitor die 20 only in the time period between two subsequent clipping cycles or between the time points when a just closed clip is removed from die 20 and before the next closure clip C to be closed is positioned in die 20.

According to the present embodiment of clipping device 1, first and second closing tools 10, 20 have been described as being reversibly movable towards each other in closing direction D. Thus, it has to be understood that monitoring device 30 is coupled to die 20 to be simultaneously moved together with die 20, in order to stay aligned thereto.

Naturally, it is possible that only first closing tool 10 is moved towards second closing tool 20 during a closing cycle. In this case, second closing tool 10 and monitoring device 30, accordingly, are arranged stationary in the packaging machine.

In the present embodiment, a monitoring device is described for monitoring the second closing tool. Naturally also the first closing tool or both, the first and the second closing tools, may be monitored by the monitoring device.

It has further to be understood that any suitable sensor means may be used for monitoring one or both of the clipping tools, and that the reflector element may be omitted if not needed.

Additionally to the detection of remains in the closing tools, the monitoring device may also be used to detect the presence or absence of the clipping tools, and to stop the clipping process in case of the absence of one or both of the clipping tools.

What is claimed is:

1. A clipping device for closing at least one closure means, in a packaging machine, for closing tubular or bag-shaped packaging casings, the clipping device comprising:
   a first closing tool and a second closing tool, wherein at least the first closing tool is reversibly movable towards the second closing tool, between an opened position and a closed position, for closing the at least one closure means;
   a drive means for reversibly moving at least the first closing tool towards the second closing tool in a closing direction;
   where a monitoring device is provided in the region of the second closing tool configured for monitoring the second closing tool being prepared for the next clipping cycle, by detecting the presence or absence of a closure means, parts thereof, any debris, and the first and second closing tools themselves.

2. The clipping device according to claim 1, wherein the monitoring device comprises at least a sensor element.

3. The clipping device according to claim 2, wherein the sensor element is a laser sensor or a photo-sensor.

4. The clipping device according to claim 2, wherein the monitoring device further comprises a reflector element.

5. The clipping device according to claim 1, wherein the monitoring device comprises an emitter element and a receiver, like a sensor element, which are accommodated in a common housing.

6. The clipping device according to claim 1, wherein the monitoring device is adapted to output a signal identifying the presence or absence of a closure means in the second closing tool.

7. The method for controlling a clipping device in a packaging machine, for closing tubular or bag-shaped packaging casings, the method comprises the step of:
   controlling the clipping device on the basis of a signal received from a monitoring device according to claim 1; and
   stopping the clipping device in case of the presence of a closure means in the second closing tool.

8. A clipping machine for producing sausage-shaped products, by filling a filling material into a tubular or bag-shaped packaging casing and closing said packaging casing by a closure means, the clipping machine comprises a clipping device according to claim 1.

9. A clipping device according to claim 1 for use in a packaging machine for closing tubular or bag-shaped packaging casings by at least one closure means.

10. A method for controlling a clipping device in a packaging machine for closing tubular or bag-shaped casings, the method comprising:
   providing a clipping device configured for closing at least one closure means, the clipping device comprising,
      a first closing tool and a second closing tool, wherein at least the first closing tool is reversibly movable towards the second closing tool, between an opened position and a closed position, for closing the at least one closure means, a drive means for reversibly moving at least the first closing tool towards the second closing tool in a closing direction, and where a monitoring device is provided in the region of the second closing tool configured for monitoring the second closing tool being prepared for a subsequent clipping cycle, by detecting the presence or absence of a closure means, parts thereof, any debris, and the first and second closing tools themselves;
   controlling the clipping device on the basis of a signal received from the monitoring device; and
   stopping the clipping device in case of the presence of a closure means in the second closing tool.

11. The method of claim 10, wherein the monitoring device comprises at least a sensor element.

12. The method of claim 11, wherein the sensor element is a laser sensor or a photosensor.

13. The method of claim 11, wherein the monitoring device further comprises a reflector element.

14. The method of claim 10, wherein the monitoring device comprises an emitter element and a receiver which are accommodated in a common housing.

15. The method of claim 10, wherein the monitoring device is adapted to output a signal identifying the presence or absence of a closure means in the second closing tool.

16. A method for producing sausage-shaped products comprising, providing a clipping device configured for closing at least one closure means, the clipping device comprising,
   a first closing tool and a second closing tool, wherein at least the first closing tool is reversibly movable towards the second closing tool, between an opened position and a closed position, for closing the at least one closure means, a drive means for reversibly moving at least the first closing tool towards the second closing tool in a closing direction, and where a monitoring device is provided in the region of the second closing tool configured for monitoring the second closing tool being prepared for a subsequent clipping cycle, by detecting the presence or absence of a closure means, parts thereof, any debris, and the first and second closing tools themselves;
   filing a filling material into a tubular or bag-shaped packaging casing; and closing said packaging casing by the closure means.

17. The method of claim 16, wherein the monitoring device comprises at least a sensor element.

18. The method of claim 17, wherein the sensor element is a laser sensor or a photosensor.

19. The method of claim 17, wherein the monitoring device further comprises a reflector element.

20. The method of claim 16, wherein the monitoring device comprises an emitter element and a receiver which are accommodated in a common housing; or the monitoring device is adapted to output a signal identifying the presence or absence of a closure means in the second closing tool.

* * * * *

UNITED STATES PATENT AND TRADEMARK OFFICE
CERTIFICATE OF CORRECTION

PATENT NO. : 9,598,193 B2  
APPLICATION NO. : 13/940998  
DATED : March 21, 2017  
INVENTOR(S) : Jürgen Hanten Page 1 of 1

It is certified that error appears in the above-identified patent and that said Letters Patent is hereby corrected as shown below:

On the Title Page

Item (54) Title and in the Specification, Column 1, Line 1, after "METHOD" insert -- FOR --.

In the Claims

Claim 5, Column 5, Line 55, delete "element" and insert -- element, --, therefor.
Claim 5, Column 5, Line 56, after "receiver" delete "like a sensor element,".
Claim 16, Column 6, Line 63, delete "filing" and insert -- filling --, therefor.

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*